United States Patent [19]

Atkins

[11] Patent Number: 4,654,876
[45] Date of Patent: Mar. 31, 1987

[54] DIGITAL IMAGE MOTION CORRECTION METHOD

[75] Inventor: Arland A. Atkins, Chelmsford, Mass.
[73] Assignee: Itek Corporation, Lexington, Mass.
[21] Appl. No.: 683,831
[22] Filed: Dec. 19, 1984
[51] Int. Cl.[4] .......................... H04N 3/00; H04N 7/18
[52] U.S. Cl. ........................................ 382/54; 382/42; 382/44; 358/109
[58] Field of Search .................. 382/54, 34, 44, 42; 358/109, 105

[56] References Cited

U.S. PATENT DOCUMENTS

| | | | |
|---|---|---|---|
| 3,629,833 | 12/1971 | Demer | 382/54 |
| 3,952,299 | 4/1976 | Hodge et al. | 382/42 |
| 4,458,266 | 7/1984 | Mahoney | 358/105 |
| 4,488,174 | 12/1984 | Mitchell et al. | 358/105 |
| 4,510,618 | 4/1985 | Ataman et al. | 382/54 |

*Primary Examiner*—Howard A. Birmiel
*Attorney, Agent, or Firm*—Michael H. Wallach; Robert F. Rotella

[57] ABSTRACT

A method of image motion distortion correction involving the steps of electronically scanning an optical image to produce first and second lines of stored digital pixel data indicative of the intensity of picture elements of the optical image, registering within a corresponding scanning window position the difference between each second line picture element value of a number of sets of second line picture elements, and a number of first individual line picture elements, each corresponding to an associated set, thereafter utilizing that particular window position having the minimum accumulated difference value to produce an image shift signal having a value corresponding to that particular window position, shifting the storage position of the second line with respect to the first line by an amount proportional to the value of the shift signal, and utilizing the shifted lines of data to modulate an image producing readout device such as a CRT to reproduce the optical image.

30 Claims, 6 Drawing Figures

DIGITAL IMAGE MOTION CORRECTION METHOD

BACKGROUND OF THE INVENTION

The present invention relates to the field of correcting images distorted by relative motion between the images and the optical system.

The photographing of the surface of the earth along the line of flight of an aircraft through the use of a scanning slit is well known in the art. Such systems often employ a linear array of photodetectors in conjunction with the slit for converting the picture elements focused upon the photodetectors into electrical signals proportional to the light intensity of the picture elements making up the scene being photographed. The digital arrays may be sequentially scanned and read out, and the analog signals may be converted into digital binary data indicative of the intensity of each pixel, such data being inserted into a digital storage unit. See for example, U.S. Pat. No. 4,257,071. The result is that a first image slice, which takes the form of a digital pulse train representitive of each column of picture elements or pixels extending across the image, is stored within a first column of digital storage elements, and subsequent scan lines of picture elements are inserted into other columns of storage elements. Thus a digital store may contain light intensity information comprising a large number of picture elements, which may subsequently be read out of storage to reconstruct the optical image being scanned by the slit detector unit. Such signals may be telemetered to a distant point e.g., the surface of the earth, and may be employed to modulate a CRT beam or a laser beam for reproducing the optical scene, as is well known by those skilled in the art. Exemplary photodetector arrays and processing of the data read out of the arrays may be found in U.S. Pat. Nos. 4,064,533; 3,808,435; 3,883,437.

If the linear detector array is positioned perpendicularly with respect to the line of flight, shifts in the relative position of the slit detector unit with respect to the viewed surface of the earth will cause shifts in the relative positions of the picture element pulse trains inserted into the columns of storage elements, and if the storage elements are later sequentially readout, a distorted image is thus produced. These shifts are often produced due to camera vibration and aircraft roll.

It is thus a primary object of the present invention to eliminate these shifts between the stored lines of pixel pulse trains by electronically transforming the relative position of the pulse trains with respect to each other, thereby to eliminate the readout of a distorted image.

It is a further object of the invention to detect the degree of shift from one line of stored digital pixel data to the next, and produce a shift signal which is employed to transform the relative positions of the data to an extent and in directions to eliminate image distortion upon readout.

SUMMARY OF PREFERRED METHODS OF THE INVENTION

In accordance with a preferred method of the invention best implemented by software, a scanning window is defined having a first, second and nth position therein corresponding with a first, second and nth position of sets of first, second and nth second line picture elements scanned by the window; the differences between each second line pixel value of a first set, and the pixel value of a first pixel of the first line are stored in a plurality of n accumulators, the difference between each second line pixel value of a second set and the pixel value of a second pixel of the first line are thereafter inserted into the accumulators, and so forth with respect to subsequent sets of second line pixels and other first line pixels. The contents of the accumulators are thereafter examined and the identification of that particular accumulator having the minimum accumulated difference value therein is employed to produce an image shift signal having a value corresponding to the identification index of the minimum value accumulator. The image shift signal is thereafter employed to create a shift in the position of the second line pixel data with respect to the first line data to compensate for image distortion which would otherwise be produced upon the readout of the lines of digital picture element values stored within the digital store. These steps are repeated for subsequent image lines pipelined through storage and making up an image frame.

In accordance with a similar method of the invention, best implemented in hardware, each pixel value of the first set of second line pixels is subtracted from the value of the first pixel in the first line, and that window position having the minimum difference causes the registration of a correlation signal corresponding to that particular window position having the minimum difference value. The process is repeated with respect to second and subsequent sets of second line pixels and corresponding differing individual pixels of the first line, and upon completion of sampling of a line, that particular window position having the maximum accumulated correlation signals is identified to produce a shift signal having a value corresponding to the identification of the particular window position so identified as containing the maximum accumulated correlation signals.

The resulting image shift signals may be employed to shift the relative positions of the lines of data to correct the images reproduced in real time or may be recorded in a buffer store in a manner to tag each line to indicate the amount of shift to be applied to each line during later image reconstruction, in order to effect the image corrections desired. These methods may be carried out on pixel data or sub-pixel data generated by interpolation of the pixel values, as explained below.

Other objects, features and advantages of the present invention will become apparent upon the studying of the following detailed description taken in conjunction with the drawings in which:

SPECIFIC DESCRIPTION

Figures 1, 2:
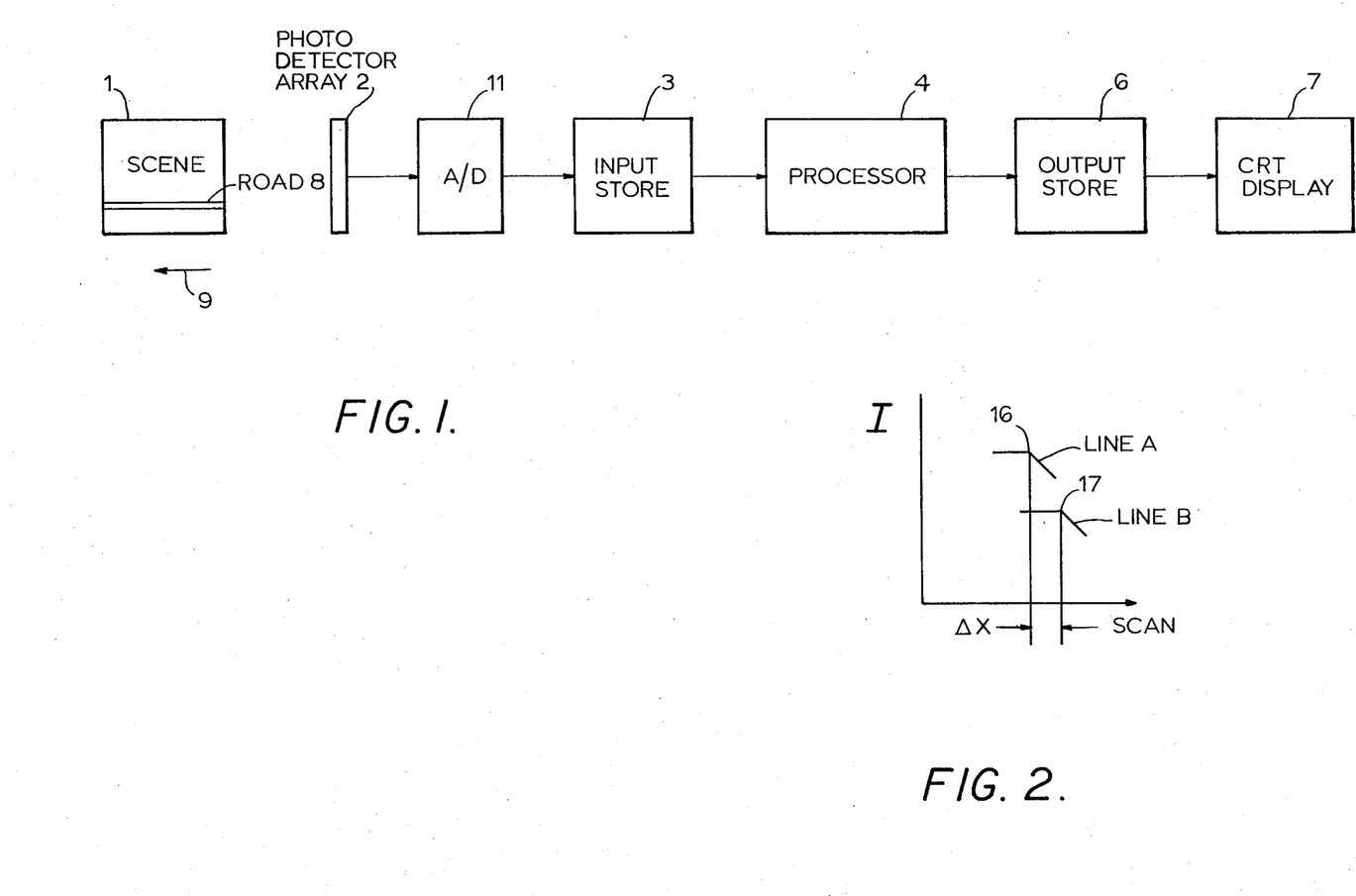
FIG. 1 illustrates schematically certain elements of the system employing the invention.
FIG. 2 illustrates schematically a particular aspect of the invention.

Referring now to FIG. 1, the scene to be photographed, schematically represented by the rectangle 1, and linear detector 2 are illustrated. A typical application of the present invention involves an aerial camera flying over territory to be photographed. As is well known in the art, a slit may be provided for producing a slit image upon a linear detector which comprises a linear array of photodetectors, typically over 100, for converting light intensity of the image being scanned into electrical signals having amplitudes proportional to the light intensity of the image focused upon the linear detector. The nature of such linear detectors is well understood by those skilled in the art. Typical types of detectors are CCD arrays, or arrays of discreet elements of lead sulfide for example, to effect the conversion of light intensity into trains of electrical signals. As the airplane flies across the scene, the linear detector is electronically scanned to produce a series of pulses proportional to the picture element or pixel intensities. For further details, reference may be made to the aforementioned U.S. patents. Input store 3 and digital processor 4 are schematically illustrated, two line FIFO input store 3 coacting with processor 4 to process the signals before they are recorded in output digital store 6, to be thereafter applied to CRT console 7 for display, or telemetered to a distant point, for reproducing the image scanned.

Let it be assumed that the aircraft is flying in a direction indicated by arrow 9 to photograph a straight road 8, parallel to arrow 9, and further let it be assumed that slit-detector array 2 is perpendicular to the direction of flight. A standard sampling device would sequentially readout linear detector 2 to forward signals to digital buffer store 3 via analog to digital converter 11. Such sampling would be performed to cause lines of digital data to be inserted into columns of storage devices, such that each column represents a scan or narrow slice of the image, perpendicular to the direction of flight represented by arrow 9. Details of this circuitry are well known to those skilled in the art and are found in the above cited patents. The line of sight changes due to aircraft roll, or vibration, cause the stored digitized lines of pixel data representing slices of the scanned image, to produce an image upon CRT display 7 which would indicate a wavering line image of road 8, rather than a straight image of the road. As discussed previously, it is a primary object of the present invention to eliminate these detrimental effects by electronic transformation of the digital data generated by the linear detector 2.

A first line tiny scan segment of scene 1 is schematically represented by line A shown in FIG. 2, wherein the intensity of the detected light could drop, for example, at point 16. In the complete absence of a change in the position of the slit relative to the scene between scans, point 17 of the second scanned line segment B would be vertically aligned with point 16. However, due to change between scans in the relative position of the slit with respect to the scene, point 17 could be displaced by delta x with respect to point 16. This diagram is a greatly exaggerated conceptual illustration of a shift in a tiny portion of a recorded pixel pulse train due to the relative detector to image motion, producing stored image slices having corresponding pixel intensity signals physically shifted with respect to each other. The digital data is processed in accordance with the invention such that those pixels representing, for example, the edge of the straight road 8, would be aligned with each other across the width of store 6 rather than be shifted across the digital store to form a wavering road image upon reconstruction by CRT display console 7. In other words, the electronic transformation of the digital pixel data in accordance with the invention will result in the display of the image of roadway 8 which is straight rather than wavering.

As is well known to those skilled in the art, a single frame (scene 1) could comprise typically 10,000 pixels or picture elements in the vertical direction and 10,000 in the horizontal direction, wherein each picture element could be encoded to produce digital signals proportional to the intensities of light within each element.

Figure 3:
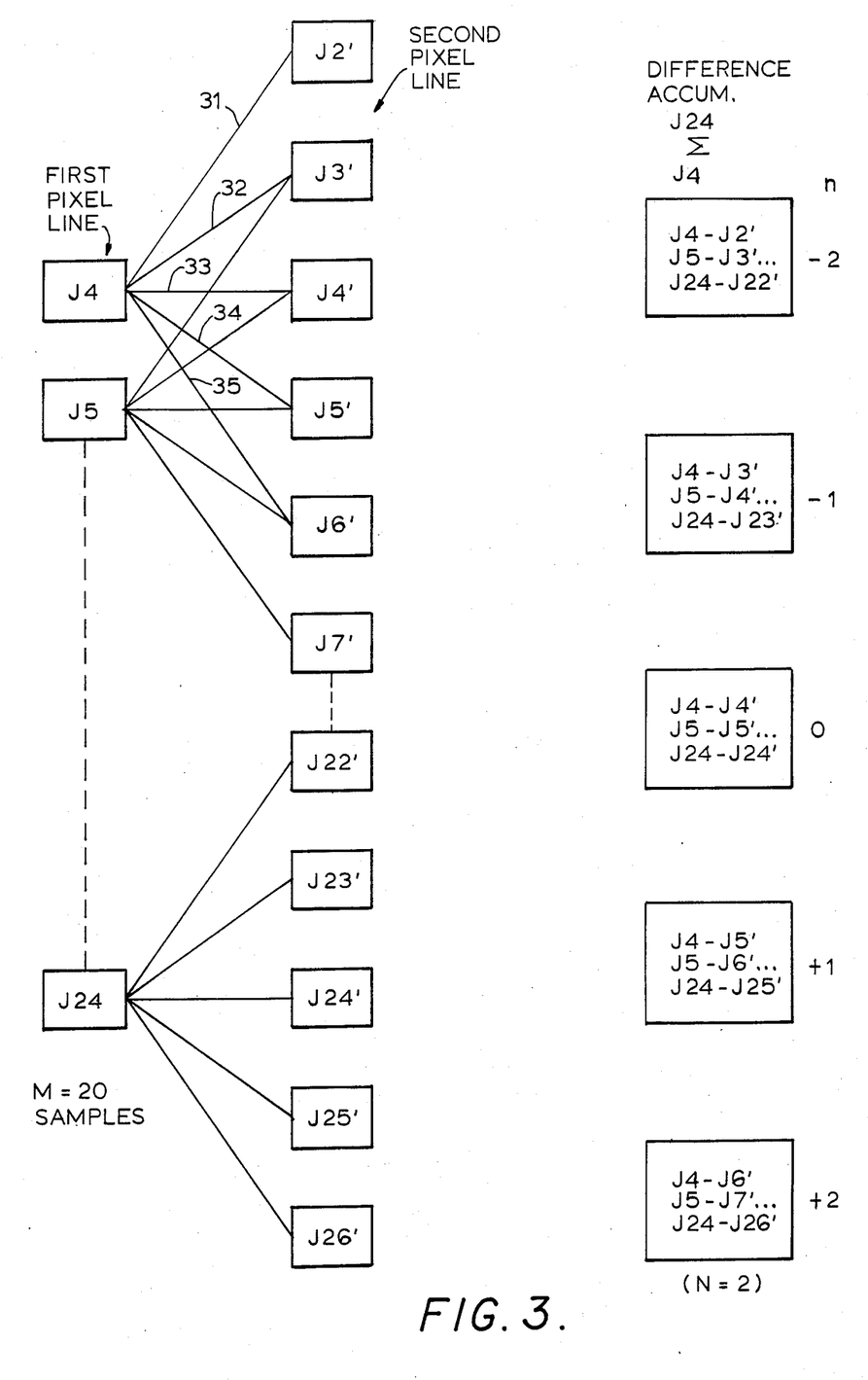
FIG. 3 schematically illustrates the manipulation of various sets of data, and the accumulation of difference values employed in practicing the invention.

FIG. 3 schematically illustrates an example of the principle of transformation of the digital data by processor 4 in simplified form. A first pixel line (column-slice) of data delivered from a single scan perpendicular to the flight path is indicated, along with selected pixels J4, J5 and J24; J6 etc. being omitted. A second scan line is represented by the middle column, commencing with the second line pixel J2' at the top of the Figure. The J4 storage element block would contain a signal proportional to the intensity of the fourth row pixel in the first vertical scan line, J5 would represent the fifth row pixel and so on such that J24 would represent the 24th row pixel of the first scan line. The J2' storage element block within the middle column of storage elements contains digital data proportional to the intensity of the pixel of the second scan line in the second row, and so on ending at the block labeled J26', which would contain the 26th row pixel of the second scan line.

Let it be assumed that there is absolutely no change in the relative position of the image with respect to the linear detector between the scanning of the first and second adjacent lines. In this case, the signal within pixel storage element block 4' would tend to equal the intensity value of the signal within pixel block J4, and accordingly, the difference between them would tend to be 0; likewise with respect to the data within storage element J5 and element 5', all the way through storage element J24 and element 24'. On the other hand, image motion perpendicular to the direction of flight will shift the digital pixel data of the second line vertically within the column of storage elements schematically indicated in FIG. 3. For example, a slight shift could cause the pixel in storage element J3' to correspond with the signal in storage element J4, and an even greater shift in the same direction could cause the signal in element J2' to correspond with the pixel in storage element J4. Since the pixels in the second line storage elements are being subtracted from the pixel values in the first line storage elements in accordance with the invention, the differences will be minimal for those pixels which correspond to each other. These difference values are accumulated within a set of, for example, five accumulators, schematically illustrated at the right hand portion of FIG. 3, and are designated as the n−2 accumulator, and the n−1, 0, n+1, and n+2 difference accumulators. Over a given number of scans, the difference accumulator 0 will accumulate the differences between the pixel intensity values in those pixels which are compared with each other from two different vertical lines but lie in the same storage row. For example, during the first comparison process whereby the values within elements J2', J3', J4', J5' and J6' are subtracted from the pixel value in storage element J4, the difference between the pixel value in element J4' and J4 will be inserted into the 0 difference accumulator. In like manner the difference between the pixel value in element J3' and the element in J4 will be inserted into the n−1 accumulator, the difference between the signal in element J2' and the pixel value in element J4 will be inserted into the n−2 accumulator, the difference between the pixel value in store element J6' and the pixel value in the J4 element is stored in the n+2 accumulator, and lastly the difference between the pixel value in element 5' and the pixel value in element J4 will be stored in the n+1 accumulator. The first differencing step is represented by line 31, the second differencing step by line 32 and so on through line 35, representing the differencing of the pixel value in storage element 6' from the pixel value in storage element J4.

One could examine the contents of the 5 different accumulators and determine that the minimum difference value is within, for example, difference accumulator 0. In this case this would indicate a 0 vertical compensatory shift in the data between the two scan lines. Should the minimum difference value be found in the n−1 accumulator rather than the 0 difference accumulator, this would indicate an upward relative shift in the digital data of the second line with respect to the data of the first line. If the minimum difference value was in the n−2 accumulator, this would indicate a greater upward shift in pixel displacement. If the "roadway" shown in FIG. 1 were a black line in the J4 pixel position and was hypothetically one pixel wide rather than a conventional road image, and if no image motion were present, the black pixel J4 in the fourth row would not be shifted from one row to the next in the two line digital storage device; rather it would remain in the fourth row as scanning proceeds so that accumulator 0 would continue to have a minimum difference value. Upon input of the first two scan lines, the digital signals representative of the first scan line (image slice) could be positioned in the column of storage elements, some of which are illustrated at the left hand portion of FIG. 3, while the signals representative of the second line could be stored within the centrally positioned column of elements of FIG. 3. The subtraction process mentioned above, schematically represented by lines 31 through 35, is carried out and the differences are inserted into the five accumulators illustrated in the righthand portion of FIG. 3.

Figure 4:
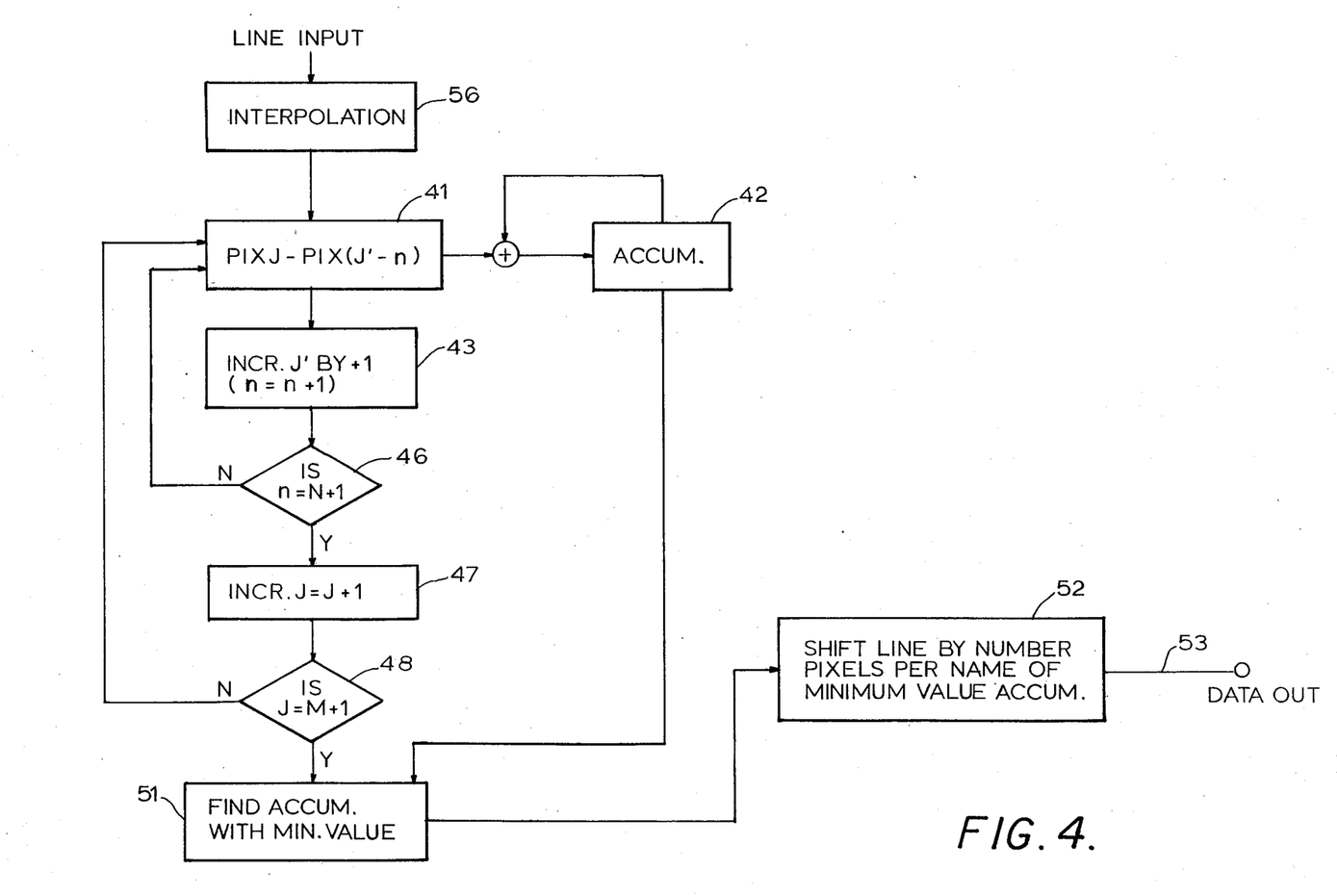
FIG. 4 illustrates a flow chart which helps clarify such data manipulation.

In the flow chart of FIG. 4, block 41 illustrates the subtraction process whereby the differences are accumulated as represented by block 42. Block 41 indicates the subtraction of the value of pixel J2' in the second line from pixel J4, and the insertion of this difference within the n−2 accumulator. After the last or fifth subtraction process, involving J6'−J4, and the insertion of the difference in the n+2 accumulator, it is desired to initiate the differencing between the values of pixels 3', 4', 5', 6' and 7' from the pixel value of J5. The subtraction process is similar to the process mentioned above, whereby the difference between the pixel value in block J3', second line, and the J5 pixel, first line, is inserted into the n−2 accumulator; the difference between the J4' pixel value and the J5 pixel value is inserted into the n−1 accumulator, the J5'−J5 difference in the 0 accumulator, the difference between the J6' and J5 value inserted into the n+1 accumulator, and lastly the difference between J7' and J5 being inserted into the n+2 accumulator. Thus for each first line pixel involved in the comparison process, five difference values are inserted into the five corresponding difference accumulators in our example, and the subsequent comparison of the second J5 pixel of the first line with the second set of second line pixels, are also accumulated within the same difference accumulators. The five subtraction steps are repeated in connection with first line pixels J6, J7, all the way through pixel J24, so that with respect to the comparison of two adjacent scanning lines, twenty groups of five subtractions each, are indicated. After the completion of the twentieth comparison process, the one particular accumulator of the five, which has the minimum difference value stored therein, will indicate the direction and degree of desired shift of one line (column) of data with respect to an adjacent line. Theoretically, if there is no image motion, difference accumulator 0 at the righthand portion of FIG. 3 will have the minimum value. If there was an upward one pixel shift on average, the n−1 accumulator would have the minimum value, and if there was an upward shift of two pixels, the n−2 accumulator would have a minimum value; likewise with respect to the n+1 and n+2 accumulators regarding shifts in the opposite direction. Thus the identification of that particular accumulator having the minimum accumulated pixel difference value, is indicative of the direction and extent of compensation to be applied to the most recently inserted line with respect to the previous reference line. This identification defines the value of the image shift signal which is used for image shifting.

Index integer n in our example is initially −2 to effect the comparison and subtraction of J2' from J4; n is thereafter incremented by 1, indicated by block 43, so that the next pixel to be subtracted from pixel J4 is J3' and so on. Thus block 43 indicates the incrementing of n by +1 to sequentially compare the five pixels of the first set of pixels of the second line with J4; the incremented value of n being equal to the index of each accumulator. Decision diamond 46 will produce a "yes" indication when n is incremented to equal N+1, namely the non-existent +3 difference accumulator which is not to be employed. N is two in our example since the last accumulator is n+2. Operation block 47 indicates the incrementing by 1 of J, (that first line pixel being operated on) which initiates the comparison of the next first line pixel J5 with the second set of five pixels of the second line starting with J3'. The process continues until the subtraction of the last pixel J26' in the twentieth second line pixel set, from J24 wherein M or the number of J samples is equal to twenty. The number of subtractions involving each first line pixel J, e.g. five, and the number of first line pixels J and second line pixel sets compared, e.g. twenty, are of course exemplary. Also, instead of processing J4 through J24, it may be preferable to process more widely separated pixels. Thus, the pixels indicated at the lefthand column of FIG. 3 could represent pixels in every eighth or tenth row rather than adjacent pixels as indicated. In this case the spread represented by lines 31 through 35 would be greatly increased.

Decision diamond 48 produces a yes indication when the twenty first J pixel (J25) is indicated as being ready to be operated on. At this time, the subtraction phase ceases, and the next phase operation represented by block 51, is carried out to identify that difference accumulator having the minimum value. The identification of the index of such accumulator could be employed to produce an image shift signal used to tag the line of data with shift data indicative of the degree and direction of shift of the second line of pixels to produce a best intensity curve fit with respect to the first line upon later image reconstruction. Alternatively, the second line could, if desired, be shifted along the column of the store in real time in response to the shift signal to best fit the two columns of data, and the third line being scanned is thereafter inserted into storage elements formerly occupied by the second line, and as a result the previous second line occupies the first line position and becomes the "first" line reference to which the third line, now the "second" line, is compared. Thus block 52 is designated as "shift line by the number of pixels per [indicated by the] name of the minimum value accumulator." In the interest of clarity, brevity and economy, the particular steps employed in the operations represented by blocks 51 and 52 will not be explained in detail, since the steps for carrying out these functions are well known to those skilled in the programming art. The data for producing a visual image may be extracted from the system at data output terminal 53, to be utilized to operate for example, CRT console 7 of FIG. 1. This output data could also be inputed to another buffer store and the columns could be shifted as mentioned above in accordance with the tags indicating the particular accumulators having the minimum value. Putting it another way, each particular pixel such as, for example, pixel J5 could be "renamed" as pixel J3' to compensate for the image motion. Should image motion be in an opposite direction, pixel J5 could be "renamed" as pixel J6' or J7' depending on the degree of image motion to be compensated for. Thus the resulting shift signals could effect image motion compensation for dynamic viewing on a line by line basis in real time, or may be stored, by tagging each line, in a buffer store for subsequent correction on a frame by frame basis. The shift signals could also, if desired, be used in a closed loop servo system for physically shifting the optical line of sight. The principal error to be corrected in aerial photography involves the rolling of the plane which changes the line of sight. Vibrations of the camera could also be compensated for.

It should now be understood that the above described steps define a scanning window having positions therein corresponding to positions of the second line pixels subtracted from selected first line pixels and the five accumulators register within a corresponding window position, the pixel value difference between each second line pixel value of a first set of second line pixels, and the pixel value of a first pixel of the first line. The scanning window is now "moved" so as to register in the same five accumulators the difference between each second line pixel value of a second set of second line pixels, and the pixel value of a second pixel of the first line, and so forth with respect to subsequent sets. The identification of that particular accumulator, or window position, having the minimum accumulated difference value upon completion of scanning of a pair of lines, results in the production of an image shift signal having a value corresponding to the index of the particular minimum value accumulator. The next line is inserted into storage and the entire two line comparison process is repeated.

My invention may also be employed for vibrational analysis. For example, if a thin, opaque straight line is placed on a vibrating body, such line may be vertically scanned and the resulting shift signals produced by the vertical scanning of the horizontal line may be used to operate a CRT beam to actually plot the displacement as a function of time of the vibrating body. My invention may also be employed to produce plots of the motion of moving targets.

In accordance with another method of practicing the invention, the minimum difference position instead of the minimum difference value in each pixel set is summed with the minimum difference position in all sets, and the resulting maximum value determines the desired shift per line. More specifically, each pixel value of the first set of five second line pixels is subtracted from the first pixel value of the first line, and after the fifth subtraction step, the data is examined to determine which subtraction step yielded the minimum difference, and a correlation signal corresponding to that particular window position having the minimum difference value is registered. For example, in FIG. 3 if the comparison between J3' and J4 yields the minimum difference value, a binary 1 would be inserted into the $n-1$ accumulator associated with the second window position. If subtraction of the 4' pixel value from the value of J5 yields the minimum value, another binary 1 would be inserted into the same $n-1$ accumulator associated with pixel 4' of the second set of second line pixels. The process continues until the end of the subtraction process involving first line pixel J24. The binary count in the accumulators is now examined, and that accumulator having the maximum count of binary ones would indicate the window position having the minimum value and, as before, the identification or index of that particular minimum value accumulator establishes the shift signal value. This approach is believed to be more easily implemented in hardware, than the first method described.

To provide sub-pixel data in accordance with a further optional feature of the invention, the original data is expanded using linear interpolation (block 56 of FIG. 4), the shift signals are produced as explained above on the expanded data, and a new corrected image may then be formed by reducing the interpolated values to the original scale. For low frequency motion involving small degrees of line to line shift, a maximum amount of interpolation is desired. In contrast, where high frequency motion is occurring, large shifts are produced, which in turn calls for less interpolation or none. In other words, low frequency motion makes fractional pixel shifts per line desirable. FIG. 5 schematically illustrates the process of interpolation whereby the original data is expanded by an expansion factor of two. However, for high frequency motion and thus large shifts, an expansion factor of 1, equivalent to no interpolation, may be quite satisfactory in practicing the invention.

Figure 5A:
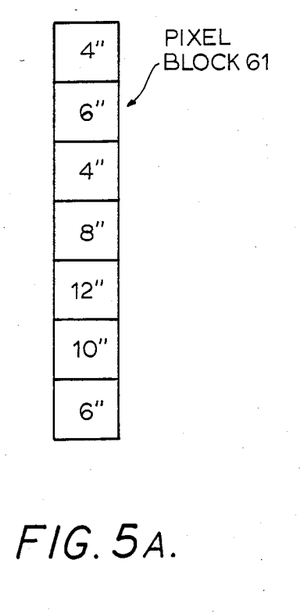
FIGS. 5a and 5b schematically illustrate the nature of the interpolation process, which may be optionally employed in connection with the invention.
Figure 5B:
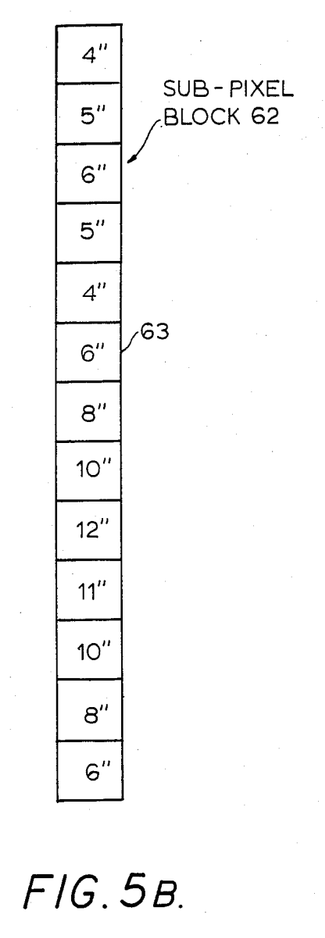

FIG. 5 indicates a seven pixel block 61 having double primed numbers within the blocks proportional to the intensity of each of the seven pixels. Let it be assumed that we wish to employ an expansion factor of two to provide sub-pixel intensity values to be acted upon by the processor, rather than the seven pixel values. By virtue of techniques well known to those skilled in the art, intermediate blocks of interpolated values are "inserted" within the blocks of FIG. 5a, to expand the number of sub-pixels to be processed. For example, linear interpolation between the first pixel having intensity value of 4 and the second pixel having an intensity value of 6 would produce an interpolated value of 5 which is "inserted" between pixel blocks 4 and 6 as shown at the upper righthand portion of FIG. 5b. Likewise, linear interpolation between second and third pixels of block 61 again produce an interpolated value of 5, whereas interpolation between the pixel value 4 and the pixel value 8 of the third and fourth pixel blocks respectively, would produce an interpolated value of 6 indicated at 63 in FIG. 5b, and so on. Processing would be carried out as described above on the expanded sub-pixel values, and a new corrected image is then formed by reducing the interpolated values to the original scale.

It will be apparent to those skilled in the art that numerous variations in the above described steps may be employed for carrying out the invention, and thus the invention is to be limited only by the scope of the language of the following claims and reasonable equivalents thereof. For example, the term "picture element" as used in the claims, includes both pixels and interpolated sub-pixels. The sequence of selection of the pixels in each second line set need not be in numerical order but could be mixed and in like manner the first line pixels could be randomly examined rather than in order, as described.

I claim:

1. A method of enabling the transformation of the position of a second line of image data with respect to a first line of image data comprising the steps of:
    a. defining a scanning window having a first, second and nth position therein corresponding to a first, second and nth position of sets of first, second and nth second line picture elements scanned by said window, n being an integer;
    b. registering data indicative of the differences between second line picture element values of a first set of second line picture elements and the picture element value of a first picture element of said first line;
    c. registering data indicative of the differences between second line picture element values of a second set of second line picture elements and the picture element value of a second picture element of said first line, and so forth with respect to subsequent sets of second line picture elements and other first line picture elements scanned by said window;
    d. identifying that particular window position having data associated therewith indicative of the minimum accumulated differences upon the completion of steps b and c; and
    e. utilizing said particular window position identified in accordance with step d to produce an image shift signal having a value corresponding to said particular window position identified in accordance with step d.

2. The method of claim 1 including the step of shifting the position of said second line with respect to said first line by an amount proportional to the value of said image shift signal.

3. The method of claim 2 wherein said image shift signal is stored along with said second line picture elements to tag said second line for later image shifting.

4. The method of claim 1, 2, or 3 wherein the steps thereof are repeated with respect to subsequent lines of picture elements until an entire image frame is processed.

5. The method of claim 1, 2, or 3 wherein said picture elements are pixels.

6. The method of claim 1, 2, or 3 wherein said picture elements are sub-pixels produced by interpolation of pixels.

7. The method of claim 4 wherein said picture elements are sub-pixels produced by interpolation of pixels.

8. A method of enabling the transformation of the position of a second line of image data with respect to a first line of image data comprising the steps of:
    a. defining a scanning window having a first, second and nth position therein corresponding to a first, second and nth position of sets of first, second and nth second line picture elements scanned by said window, n being an integer;
    b. registering within a corresponding window position the difference between each second line picture element value of a first set of second line picture elements and the picture element value of a first picture element of said first line;
    c. registering within a corresponding window position the difference between each second line picture element value of a second set of second line picture elements and the picture element value of a second picture element of said first line, and so forth with respect to subsequent sets of second line picture elements and other first line picture elements;
    d. identifying that particular window position having the minimum accumulated difference value upon the completion of steps b and c; and
    e. utilizing said particular window position identified in accordance with step d to produce an image shift signal having a value corresponding to said particular window position identified in accordance with step d.

9. The method of claim 8 including the step of shifting the position of said second line with respect to said first line by an amount proportional to the value of said shift signal.

10. The method of claim 9 wherein said image shift signal is stored along with said second line picture elements to tag said second line for later image shifting.

11. The method of claim 8, 9, or 10 wherein the steps thereof are repeated with respect to subsequent lines of picture elements until an entire image frame is processed.

12. The method of claim 8, 9, or 10 wherein said picture elements are pixels.

13. The method of claim 8, 9, or 10 wherein said picture elements are sub-pixels produced by interpolation of pixels.

14. The method of claim 11 wherein said picture elements are sub-pixels produced by interpolation of pixels.

15. A method of enabling the transformation of the position of a second line of image data with respect to a first line of image data comprising the steps of:
    a. defining a scanning window having a first, second and nth position therein corresponding to a first, second and nth position of sets of first, second and nth second line picture elements scanned by said window, n being an integer;
    b. comparing each picture element value of a first set of second line picture elements with a first picture element of said first line and determining which window position has the minimum difference value and registering a correlation signal corresponding to that particular window position having the minimum difference value;
    c. repeating step b with respect to second and subsequent sets of second line picture elements and corresponding differing individual picture elements of said first line;
    d. thereafter identifying which particular window position has registered the maximum number of correlation signals; and
    e. generating a shift signal having a value corresponding to the identification of said particular window position, identified in accordance with step d.

16. The method of claim 15 including the step of shifting the position of said second line with respect to said first line to the extent indicated by the value of said shift signal.

17. The method of claim 16 wherein said image shift signal is stored along with said second line picture elements to tag said second line for later image shifting.

18. The method of claim 15, 16, or 17 wherein the steps thereof are repeated with respect to subsequent lines of picture elements until an entire image frame is processed.

19. The method of claim 15, 16, or 17 wherein said picture elements are pixels.

20. The method of claim 15, 16, or 17 wherein said picture elements are sub-pixels produced by interpolation of pixels.

21. The method of claim 18 wherein said picture elements are sub-pixels produced by interpolation of pixels.

22. The method of claims 1, 2, 3, 8, 9, 10, 15, 16 or 17 wherein adjacent sets of said second line picture elements have picture elements in common.

23. A method of enabling the transformation of the position of a second line of image data with respect to a first line of image data comprising the steps of:
   a. scanning an optical image to produce said first and second line of image data indicative of the intensity of picture elements of said optical image;
   b. defining a scanning window having a first, second and nth position therein corresponding to a first, second and nth position of sets of first, second and nth second line picture elements scanned by said window, n being an integer;
   c. registering within a corresponding window position the difference between each second line picture element value of a first set of second line picture elements and the picture element value of a first picture element of said first line;
   d. registering within a corresponding window position the difference between each second line picture element value of a second set of second line picture elements and the picture element value of a second picture element of said first line, and so forth with respect to subsequent sets of second line picture elements and other first line picture elements;
   e. identifying that particular window position having the minimum accumulated difference value upon the completion of steps b and c;
   f. utilizing said particular window position identified in accordance with step d to produce an image shift signal having a value corresponding to said particular window position identified in accordance with step d;
   g. shifting the position of said second line with respect to said first line by an amount proportional to the value of said shift signal; and
   h. utilizing the lines of data shifted in accordance with step g to modulate an image producing readout device to reproduce said optical image.

24. The method of claim 23 wherein said picture elements are pixels.

25. The method of claim 23 wherein said picture elements are sub-pixels produced by interpolation of pixels.

26. The method of claim 23, 24 or 25 wherein adjacent sets of said second line picture elements have picture elements in common.

27. A method of enabling the transformation of the position of a second line of image data with respect to a first line of image data comprising the steps of:
   a. scanning an optical image to produce said first and second line of image data indicative of the intensity of picture elements of said optical image;
   b. defining a scanning window having a first, second and nth position therein corresponding to a first, second and nth position of sets of first, second and nth second line picture elements scanned by said window, n being an integer;
   c. comparing each picture element value of a first set of second line picture elements with a first picture element of said first line and determining which window position has the minimum difference value, and registering a correlation signal corresponding to that particular window position having the minimum difference value;
   d. repeating step b with respect to second and subsequent sets of second line picture elements and corresponding differing individual picture elements of said first line;
   e. thereafter identifying which particular window position has registered the maximum number of correlation signals;
   f. generating a shift signal having a value corresponding to the identification of said particular window position, identified in accordance with step e;
   g. shifting the position of said second line with respect to said first line to the extent indicated by the value of said shift signal; and
   h. utilizing the lines of data shifted in accordance with step g to modulate an image producing readout device to reproduce said optical image.

28. The method of claim 27 wherein said picture elements are pixels.

29. The method of claim 27 wherein said picture elements are sub-pixels produced by interpolation of pixels.

30. The method of claim 27, 28 or 29 wherein adjacent sets of said second line picture elements have picture elements in common.

* * * * *